United States Patent
Ghere et al.

(10) Patent No.: US 12,221,243 B2
(45) Date of Patent: *Feb. 11, 2025

(54) ROBOTIC PRODUCT LABELING SYSTEM

(71) Applicant: SHAW INDUSTRIES GROUP, INC., Dalton, GA (US)

(72) Inventors: Brian Michael Ghere, Chattanooga, TN (US); Timothy David Ralston, Calhoun, GA (US)

(73) Assignee: SHAW INDUSTRIES GROUP, INC., Dalton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,130

(22) Filed: Oct. 18, 2023

(65) Prior Publication Data

US 2024/0043160 A1 Feb. 8, 2024

Related U.S. Application Data

(63) Continuation of application No. 17/644,271, filed on Dec. 14, 2021, now Pat. No. 11,884,444.

(51) Int. Cl.
*B32B 41/00* (2006.01)
*B25J 9/00* (2006.01)
(Continued)

(52) U.S. Cl.
CPC ............... *B65C 9/40* (2013.01); *B25J 9/0093* (2013.01); *B25J 15/0616* (2013.01); *B25J 19/02* (2013.01);
(Continued)

(58) Field of Classification Search
CPC .. B65C 9/40; B65C 1/021; B65C 9/26; B65C 9/46; B65C 2009/401; B65C 2009/407;
(Continued)

(56) References Cited

U.S. PATENT DOCUMENTS 4,927,486 A 5/1990 Fattal et al.
5,188,687 A 2/1993 Baum
(Continued)

FOREIGN PATENT DOCUMENTS

CN 108002050 A 5/2018
CN 109051159 A 12/2018
(Continued)

OTHER PUBLICATIONS

International Search Report and Written Opinion for International Application No. PCT/US2022/081528 dated Apr. 18, 2023, 21 pages.

*Primary Examiner* — Michael N Orlando
*Assistant Examiner* — Joshel Rivera
(74) *Attorney, Agent, or Firm* — Lathrop GPM; Laura A. Labeots

(57) ABSTRACT

A system moves items, like containers and/or pallets, through a label printing station. The station has a label printer that prints adhesive labels; and a robot arm terminating at a movable end with a suction pad or vacuum device and sensors. The station has sensors configured to measure a height of the item; and a processor coupled to receive the height of the item, to control the robot arm and label printer, and to receive label information from a server. The processor has a memory containing code that computes desired label positions based on height of the container/pallet. A method of labeling an item includes printing an adhesive label with the label information obtained from a server; receiving the adhesive label on a suction pad or vacuum device attached to a movable end of a robot arm, and determining a first labeling position from measured height of the container/pallet.

20 Claims, 3 Drawing Sheets

(51) Int. Cl.
  *B25J 15/06* (2006.01)
  *B25J 19/02* (2006.01)
  *B41J 3/407* (2006.01)
  *B65C 1/02* (2006.01)
  *B65C 9/26* (2006.01)
  *B65C 9/40* (2006.01)
  *B65C 9/46* (2006.01)
  *G01S 17/08* (2006.01)
  *G06K 19/06* (2006.01)

(52) U.S. Cl.
  CPC ............ *B41J 3/4075* (2013.01); *B65C 1/021* (2013.01); *B65C 9/26* (2013.01); *B65C 9/46* (2013.01); *G01S 17/08* (2013.01); *G06K 19/06028* (2013.01); *B65C 2009/401* (2013.01); *G05B 2219/50391* (2013.01)

(58) Field of Classification Search
  CPC ...... B25J 9/0093; B25J 15/0616; B25J 19/02; B41J 3/4075; G01S 17/08; G06K 19/06028; G05B 2219/50391
  USPC .................... 156/60, 64, 350, 351, 378, 379
  See application file for complete search history.

(56) References Cited

U.S. PATENT DOCUMENTS

| | | |
|---|---|---|
| 5,425,823 A | 6/1995 | Woodside, III |
| 5,674,335 A | 10/1997 | Aman et al. |
| 5,750,004 A | 5/1998 | Wurz et al. |
| 6,672,356 B1 | 1/2004 | Jenkins et al. |
| 10,899,489 B2 | 1/2021 | Dijkstra et al. |
| 11,884,444 B2 * | 1/2024 | Ghere .................. B65C 1/021 |
| 2011/0252986 A1 | 10/2011 | Pitzer et al. |
| 2014/0096900 A1 | 4/2014 | Wojdyla et al. |
| 2015/0225104 A1 | 8/2015 | Reed |
| 2019/0311489 A1 | 10/2019 | Lam et al. |
| 2020/0346811 A1 | 11/2020 | Schinelli et al. |
| 2022/0097892 A1 | 3/2022 | Wen et al. |

FOREIGN PATENT DOCUMENTS

| | | |
|---|---|---|
| CN | 111924252 A | 11/2020 |
| CN | 113665936 A | 11/2021 |
| EP | 0911263 A2 | 4/1999 |
| ES | 2631138 A1 | 8/2017 |
| ES | 2748905 A1 | 3/2020 |
| ES | 2753926 A1 | 4/2020 |
| FR | 3013334 A1 | 5/2015 |
| KR | 101976474 B1 | 5/2019 |
| WO | WO 2011/064417 A1 | 6/2011 |
| WO | WO 2020/076223 A1 | 4/2020 |
| WO | WO 2020/084544 A1 | 4/2020 |
| WO | WO 2020/115126 A1 | 6/2020 |

* cited by examiner

ROBOTIC PRODUCT LABELING SYSTEM

FIELD

The present document relates to the field of versatile labeling machines adaptable to apply labels to containers of a variety of sizes and shapes, including palletized containers.

BACKGROUND

It is often necessary to apply labels to containers and pallets containing various devices being packaged and/or shipped. These labels often describe container and/or pallet contents, or recipient addresses required by carriers to properly deliver the containers and/or pallets to recipients.

Label printers with rigid-arm label applicators are known in the art. For example, some prior automated systems for labeling containers and/or pallets focused on labeling pallets or containers of uniform size and shape with labels in predetermined positions. Some systems, such as those described in US 20150225104 and ES 2753926, focus on bringing a label printer/applier device to the pallet or container, where the label printer/applier then prints and attaches a desired label to the pallet or container. These existing units generally lack the ability to be used in-line and with containers and/or pallets of varying sizes and shapes without human intervention.

SUMMARY

In an embodiment, a label printing station includes a transporter adapted to move an item selected from a container and a pallet bearing a container through the label printing station. The station also includes a label printer adapted to print, and remove backing from, adhesive labels; and a robot arm having a plurality of rotatable joints, the robot arm terminating at a movable end in a suction pad or vacuum device and sensors, the robot arm positioned so that the suction pad or vacuum device can reach labels provided by the label printer and so that the robot arm can reach the item on the transporter at a labeling position within the label printing station. The station also includes sensors configured to measure a height of the item; and a processor coupled to receive the height of the item, to control the robot arm and the label printer, and to receive label information from a server; where the processor has a memory containing code.

In another embodiment, a method of labeling an item selected from a container and a pallet bearing a container includes transporting the item into a label printing station; receiving label information from a server; printing an adhesive label with the label information; and receiving the adhesive label on a suction pad or vacuum device attached to a movable end of a robot arm having a plurality of rotatable joints. The method also includes measuring height of the item; determining a first labeling position for the item, the first labeling position determined from the measured height of the item; positioning the robot arm with suction pad or vacuum device at the first labeling position and releasing the adhesive label from the suction pad or vacuum device; retreating the suction pad or vacuum device from the first labeling position; and reading the adhesive label with sensors on the movable end of the robot arm.

In one example aspect, the robotic label printing system of the present disclosure meets the existing need for a readily-available system that receives containers and pallets of variable size passing through a labeling station that use a stationary label printer combined with a label applicator on a robotic arm to apply labels at multiple automatically determined positions on each container or pallet transiting the labeling station.

DETAILED DESCRIPTION OF THE EMBODIMENTS

Figure 1:
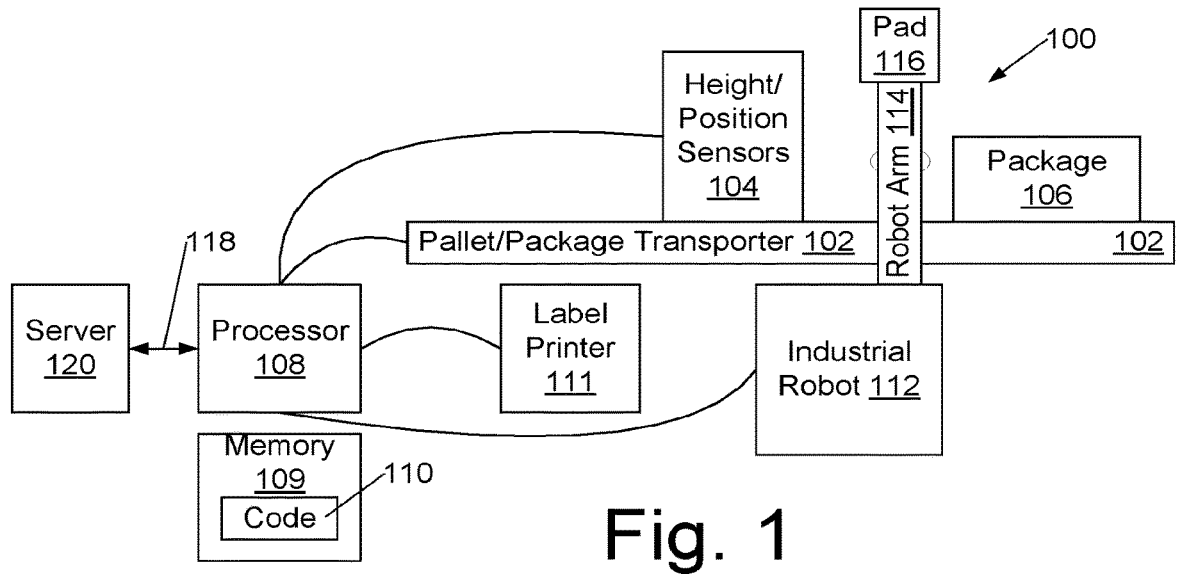
FIG. 1 is a schematic block diagram of an embodiment of a system for labeling pallets with containers of varying sizes, contents, and destinations.

The instant labeling station 100 (FIG. 1) has a container/pallet transporter 102, such as a belt or multiple rotating rollers, adapted to move containers and/or pallets bearing containers through the labeling station. The transporter is bracketed by height sensors 104. The height sensors 104 are configured to determine height of the containers and/or pallets 106, and to provide height information to processor 108. In some examples, the height sensors and/or other additional optical or other sensors, such as photoeye not shown, mounted to the conveyor are configured to detect arrival and departure of containers and/or packages (or pallets) 106 in the labeling station on transporter 102. In said examples, the height sensors and/or the other additional optical/photo sensors may be used to provide arrival time information to the processor 108 and trigger the label placement process.

Processor 108 is coupled to receive transporter speed information from transporter 102, and has ability to pause transporter 102 so that containers and/or pallets 106 can be paused briefly for labeling. Processor 108 has a memory 109 containing code 110. Processor 108 is coupled to control a label printer 111 adapted to print and dispense adhesive labels with any label backing removed. Processor 108 is also coupled to control an industrial multi-axis robot 112 having a robot arm 114 with a movable end ending in an applicator pad 116; robot 112 is positioned so that it can bring applicator pad 116 to label printer 111 to receive labels, and move applicator pad 116 to appropriate label positions on containers and/or pallets 106 present on transporter 102 in the labeling station 100. Processor 108 is also coupled, in most embodiments, through a computer network 118, to a server 120 for receiving information regarding each container and/or pallet 106 so an appropriate label can be generated. In embodiments, the label printer 111 provides adhesive labels with any backing removed, such that labels received by robot arm 114 can be gripped by vacuum through pad 116 and are ready to apply to containers and/or pallets 106.

Robot arm 114 and pad 116 are equipped with sensors (not shown in FIG. 1) that can determine position of each joint of arm 114 and forces applied through pad 116. In embodiments, pad 116 includes a vacuum device or a suction pad that can grab and release labels.

In embodiments, the label printer 111 is a CTM 3600 (trademark of CTM labeling systems, Salem, Ohio) printer-applicator, and the industrial robot 112 is a Universal Robot (Universal Robots A/S, Odense, Denmark) UR-10 multi-axis robot. In embodiments, height sensors 104 include a series of retroreflective photosensors to determine the height of the container and/or pallet. The height determined by the photosensors is used by processor 108 to determine a label placement target height on the container and/or pallet. In alternative embodiments, diffused photoelectric sensors or an overhead laser distance meter are used in place of retroreflective photosensors. An additional optical sensor mounted on pad 116 serves as a proximity detector.

In greater detail, industrial robot 112 and arm 114 has a mounting base 150 (FIG. 1A) having rotators 151 configured to rotate arm base 152 around a first shoulder axis 154, and arm base 152 has a rotator 156 configured to rotate upper arm 160 around a second shoulder axis 158, rotations about first shoulder axis 154 and second shoulder axis 158 providing the robot ability to position upper arm 160 at many angles with respect to base 150. Upper arm 160 terminates in an elbow rotator 162 configured to rotate forearm base 166 around an elbow axis 164. Forearm 168, attached to forearm base 166, terminates in a first wrist rotator 170 configured to rotate second wrist rotator 172 around a first wrist axis 174. Second wrist rotator 172 is configured to rotate terminal rotator 176 about a second wrist axis 173. Terminal rotator 176 is configured to rotate a pad shaft 178 about a terminal axis 180. Attached to a distal end of pad shaft 178 is applicator pad 182. Applicator pad 182 includes a suction pad or vacuum device 184 adapted to apply labels and sensors 186. Sensors 186 includes a barcode reader and a proximity sensor (not shown).

Figure 1A:
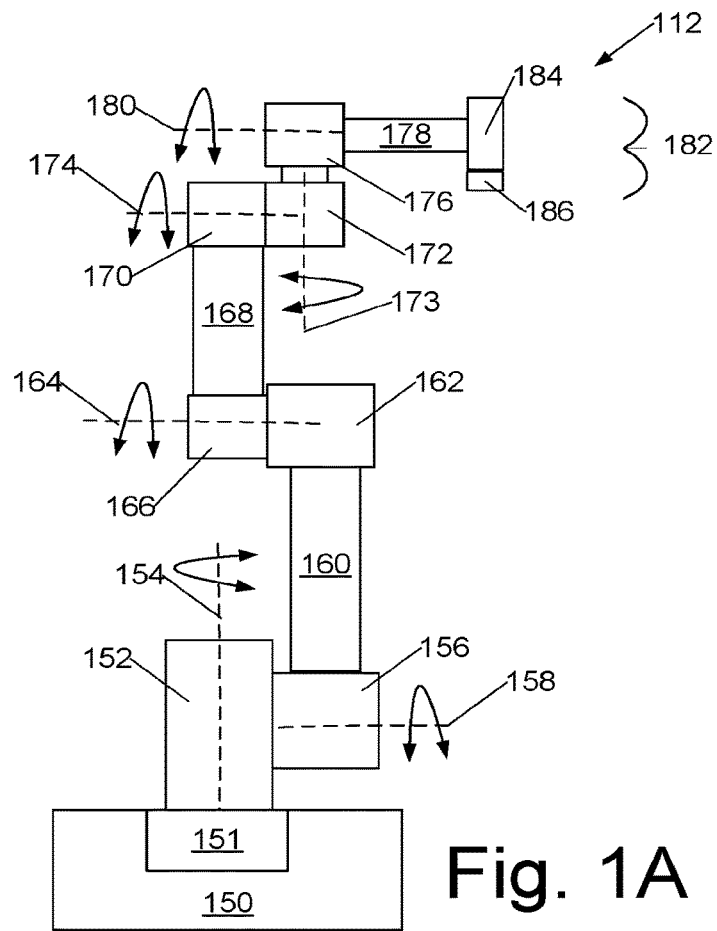
FIG. 1A is an illustration of the robot.

FIG. 1A is not to scale, and, in particular, upper arm 160, forearm 168, and pad shaft 178 are longer relative to rotators shown.

Each rotator 151, 156, 162, 170, 176, has a torque sensor (not shown) configured to allow the robot to sense pressure when it meets resistance, such as when the pad contacts a container and/or pallet. Each rotator is configured to rotate a first portion of the arm around a movable joint associated with a second portion of the arm or the arm base.

Figure 2:
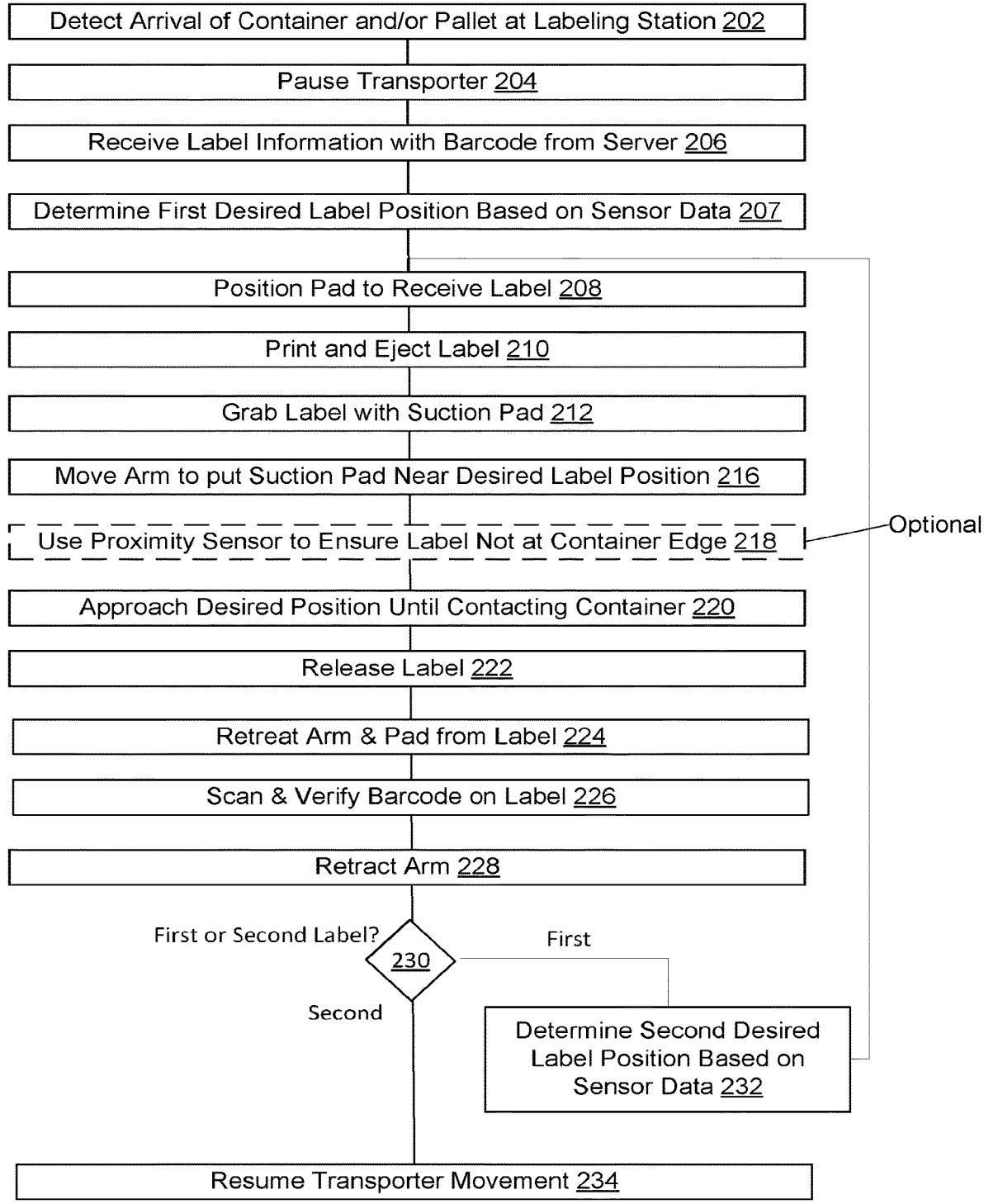
FIG. 2 is a flowchart of operation of the system for labeling pallets with containers of varying sizes, contents, and destinations.

In operation, upon other sensors, such as photoeye (not shown), detecting arrival 202 (FIG. 2) in labeling station 100, processor 108 pauses 204 transporter 102 so container and/or pallet 106 becomes stationary in labeling station 100. In alternative embodiments, additional ultrasonic, mechanical, or optical sensors not shown in FIG. 1 are mounted to the conveyor and are configured to detect 202 arrival of the container and/or pallet in the labeling station; in these embodiments detection 202 of arrival of the container and/or pallet by these additional sensors serves to trigger the labeling process herein described.

Processor 108 uses information from sensors 104 to determine an actual height of container and/or pallet 106. Processor 108, acting under control of code 110, receives label information from server 120, including a barcode and additional information of use during shipping. Processor 108 may also receive an expected height of container and/or pallet 106; should actual height of container and/or pallet 106 differ significantly from the expected height of container and/or pallet 106, processor 108 may declare an error or request human intervention to resolve the inconsistency.

Processor 108, acting under control of code 110, determines 207 a suitable location on the container or pallet for the first label. In some embodiments, the processor includes multiple processors distributed across different systems. In other embodiments, the process includes a single processor on a single system. In an embodiment, a suitable location for the first label is atop the container or pallet near a front of the container or pallet at a height slightly below a height determined as slightly below the lowest retroreflective sensor of linear sensor array 104 that failed to detect arrival of the container and/or pallet. In alternative embodiments using an overhead laser distance meter, a suitable location for the label is atop the container or pallet at a height equal to a top of the container or pallet. In still other embodiments, a suitable location for the label can be chosen or optimized as required for the particular situation and particular container or pallet. Multiple labels can be placed at multiple locations on the pallet and/or container as needed and the placement of multiple labels can be configured such that the labels do not overlap upon placement.

Figure 3:
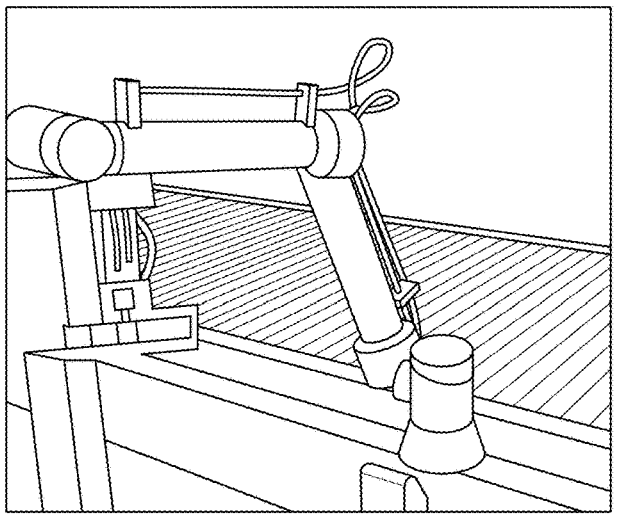
FIG. 3 is a photograph of a robot of a prototype system receiving a label onto the suction pad or vacuum device on the robot arm.

Processor 108, acting under control of code 110, then drives robot 112 to position 208, which is the suction pad or vacuum device 184 adjacent label printer 111, and requests label printer 111 to print 210 the first label, remove the backing, and eject the first label (not shown in FIG. 1 or 1A) in position where suction pad or vacuum device 184 uses its vacuum suction to grab 212 the first label as shown in FIG. 3. In an embodiment, processor 108 and suction pad or vacuum device 184 wait a predetermined time after print instructions are issued to the label printer before the processor 108 applies suction to grab the label. In an alternative embodiment processor 108 and suction pad or vacuum device 184 waits until the label printer 111 has reported ejecting the label to processor 108.

The label obstructs vacuum flow through suction pad or vacuum device 184. This obstruction is detectable as high suction above a threshold on vacuum lines attached to suction pad or vacuum device 184, while absence of a label is detectable as low suction pressure. In an embodiment, this suction pressure is monitored and an error declared if low suction pressure continues beyond a short time after the processor 108 has applied suction to suction pad or vacuum device 184 to grab the label.

The processor 108, under control of code 110, then drives robot 112 to position its arm to put 216 suction pad or vacuum device 184 near, but in front of and slightly above, the desired label position.

In some but not all embodiments, the processor, again under control of code 110, has the robot swing the arm horizontally to slightly above the desired first label position while using a proximity sensor on sensors 186 to ensure 218 the suction pad or vacuum device 184 and position the label will be placed at the desired location and that the label placement is not at a container and/or pallet edge. The placement is done by looking for a proximity sensor detection of the container and/or pallet as the arm swings toward the desired label position for a significant and predetermined distance before reaching a point above the desired label position, and if that predetermined distance is not met, then shifting the first desired label position further to the rear of the container and/or pallet 106 and moving the arm to position the suction pad or vacuum device 184 at that shifted label position. In some exemplary embodiments, the proximity sensors 186 paired with a known travel speed of the packages or container along the conveyor may be used to determine and/or provide a measurement of the width of the container or pallet, which is transvers to the direction of movement on the conveyer. In some embodiments, this measurement of the width of the container or pallet is compared to an expected width of the container and/or pallet and an error is declared if they differ significantly in order to avoid placing incorrect labels on containers or pallets.

Figure 4:
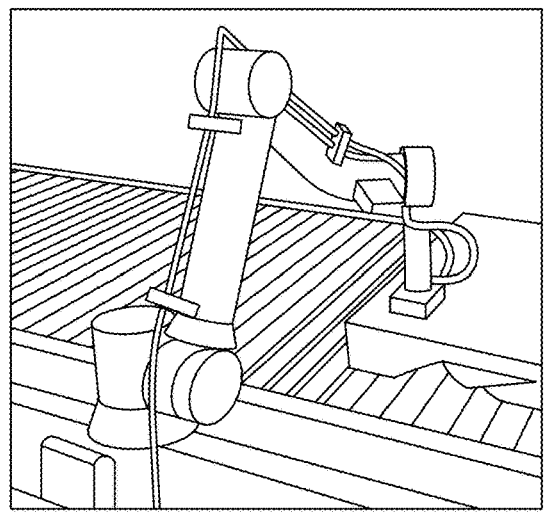
FIG. 4 is a photograph of the robot of FIG. 3 applying the label on the container/pallet.

Next, processor 108, acting under control of code 110, directs the robot to vertically approach 220 the first desired label position until the suction pad or vacuum device 184 contacts the container and/or pallet 106, with contact being observed as an increase in torque at sensors at rotators 151, 156, 162, 170, 176 of the robot. At this point with suction pad or vacuum device and label in contact with the container/pallet, the label is in the first desired labeling position. In an alternative embodiment, contact is determined using a microswitch of pad sensors 186. Processor 108 then turns off suction and admits air to remove suction from suction pad or vacuum device 184 to release 222 the label. In a particular embodiment, air is applied through vacuum lines to suction pad or vacuum device 184 to blow off the label with the label being placed as shown in FIG. 4.

Figure 5:
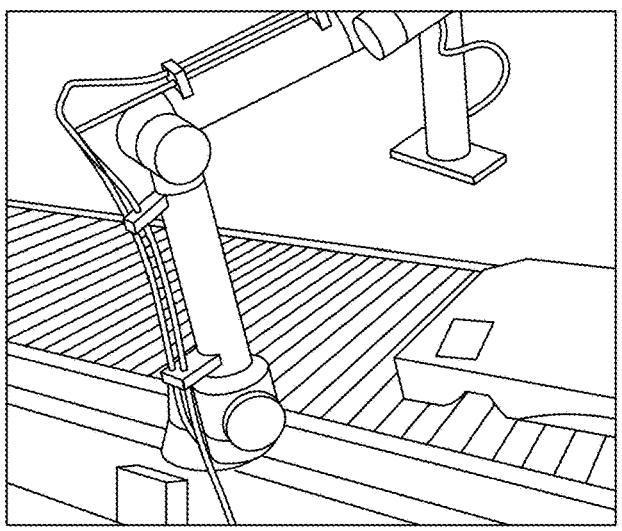
FIG. 5 is a photograph of the robot of FIG. 4 using sensors on the robot arm to read the label after it has been applied to the container/pallet.

Processor 108, again under control of code 110, then directs the robot 112 to retreat 224 or withdraw the suction pad or vacuum device 184 to a point vertically above the label and distant enough that a barcode reader of suction pad or vacuum device sensors 186 can scan 226 and verify the label is present and correct (as shown in FIG. 5) before directing robot 112 to retract 228 the arm so it will not obstruct passage of the container and/or pallet.

Once a first label is placed, if 230 only the first label has been placed, processor 108 under control of code 110 determines 232 an appropriate position for a second label. In a particular embodiment the appropriate position for the second label is on a different surface of the container/pallet 106 than the determined position of the first label, such as on a side of container/pallet 106, while the first label position is on top of container/pallet 106. In an alternative embodiment, particularly applicable to low containers and/or pallets, the determined position of the second label is on a same surface as the determined position of the first label, but offset from the position of the first label. In some example embodiments, the labels are placed in a position that allows lift truck operators to easily scan the labels from the seat on the truck. For example, if the label scanners are mounted on the non-entry side of the lift truck (operator's right hand), the labels are placed on the same side on the pallets for easy scan which in turn significantly improves the overall process efficiency by reducing the time taken to scan the pallets.

Processor 108, acting under control of code 110, then drives robot 112 to position 208 with the suction pad or vacuum device 184 adjacent label printer 111 and requests label printer 111 print 210 the second label, remove backing, and eject the second label (not shown in FIG. 1 or 1A) in position where suction pad or vacuum device 184 uses its vacuum suction to grab 212 the second label.

The processor 108, under control of code 110, then drives robot 112 to position its arm to put slightly to a side of the desired second label position. The processor, again under control of code 110, has the robot swing the arm to horizontally approach 220 the second label's desired position until the suction pad or vacuum device 184 contacts the container 106, contact being observed as an increase in torque at sensors at rotators 151, 156, 162, 170, 176 of the robot. In an alternative embodiment, contact is determined using a microswitch of pad sensors 186. Processor 108 then turns off suction and admits air to remove suction from suction pad or vacuum device 184 to release 222 the second label, Processor 108, again under control of code 110, then directs the robot 112 to retreat 224 the suction pad or vacuum device 184 to a point away from the label and distant enough that a barcode reader of suction pad or vacuum device sensors 186 can scan 226 and verify the label is present and correct before directing robot 112 to retract 228 the arm so as to not obstruct passage of the container and/or pallet. In a particular embodiment, the arm is retracted into a home position with pad near to the label printer.

Once a second label is placed, if 230 both labels have been placed, processor 108 under control of code 110 permits transporter 102 to resume 234 operation.

Changes may be made in the above methods and systems without departing from the scope hereof. It should be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A label printing station comprising:
a label printer adapted to print and remove backing from labels;
a robot arm having a plurality of rotators comprising a torque sensor, the robot arm terminating at a movable end in a vacuum device or suction pad and sensors, the robot arm positioned so the vacuum device or suction pad can reach the labels provided by the label printer and so the robot arm can reach the item on the transporter at a labeling position within the label printing station;
at least one sensor configured to measure a height of the item; and
a processor coupled to the label printer to control printing and removal of backing from labels, coupled to the sensor to receive the height of the item, coupled to the robot arm to control movement of the robot arm, and coupled to a server to receive label information/;
where the processor has a memory containing code.

2. The label printing station of claim 1 where the code comprises code configured to:
determine a first labeling position for the item, the first labeling position determined from the height of the item;
direct the label printer to print a first label;
direct the robot arm to position the robot arm to receive the first label onto the suction pad or vacuum device;
direct the robot arm to position the robot arm with the suction pad or vacuum device at the first labeling position and to release the first label from the suction pad or vacuum device;
retreat the suction pad or vacuum device from the first labeling position; and
read the first label with second sensors on the movable end of the robot arm.

3. The label printing station of claim 2 where the code further comprises code configured to:
determine a second labeling position for the item;
direct the label printer to print a second label;
direct the robot arm to position the robot arm to receive the second label onto the suction pad or vacuum device;
direct the robot arm to position the robot arm with the suction pad or vacuum device at the second labeling position and to release the second label from the suction pad or vacuum device;
retreat the suction pad or vacuum device from the second labeling position; and read the second label with the second sensors on the movable end of the robot arm.

4. The label printing station of claim 2, wherein the second sensors on the movable end of the robot arm further comprises a proximity sensor, and wherein the code configured to direct the robot arm to position the robot arm with the suction pad or vacuum device at the first labeling position further comprises code configured to use the proximity sensor to verify the first labeling position is not at an item edge.

5. The label printing station of claim 2 wherein the sensors configured to measure a height of an item comprise an array of retroreflective photosensors.

6. The label printing station of claim 2 wherein the sensors configured to measure a height of an item comprise an overhead laser distance meter.

7. The label printing station of claim 2 wherein the label information comprises a bar code.

8. The label printing station of claim 3 wherein the second label position is on a different surface of the item than the first label position.

9. The label printing station of claim 2 wherein the at least one sensor configured to detect arrival of the item in the label printing station and to measure a height of the item comprises a first sensor configured to detect arrival of the item in the label printing station and a second sensor configured to measure the height of the item, the first sensor being separate from the second sensor.

10. The label printing station of claim 2 wherein the at least one sensor configured to detect arrival of the item in the label printing station and to measure a height of the item comprises a first sensor configured to both detect arrival of the item in the label printing station and to measure height of the item.

11. A method of labeling an item selected from a container and a pallet bearing a container comprising:
receiving, from a server, label information;
printing an adhesive label with the label information and removing a backing from the adhesive label;
receiving the adhesive label on a suction pad or vacuum device attached to a movable end of a robot arm having a plurality of rotatable joints, each with a torque sensor;
measuring a height of the item;
determining a first labeling position for the item, the first labeling position determined from the measured height of the item;
positioning the robot arm with the suction pad or vacuum device at the first labeling position;
contacting the item with the adhesive label attached to the robot arm at the first labeling position, sensing pressure via the torque sensor on the robot arm when the robot arm meets resistance upon contacting the item, then releasing the adhesive label from the suction pad or vacuum device;
retreating the suction pad or vacuum device from the first labeling position; and
reading the adhesive label with sensors on the movable end of the robot arm.

12. The method of claim 11 wherein measuring a height of the item is performed with sensors comprising an array of retroreflective photosensors.

13. The method of claim 11 wherein measuring a height of the item is performed with sensors comprising an overhead laser distance meter.

14. The method of claim 11 wherein the label information comprises a bar code.

15. The method of claim 11 further comprising:
determining a second labeling position for the item;
printing a second label;
positioning the robot arm to receive the second label onto the suction pad or vacuum device;
receiving the second label on the suction pad or vacuum device;
positioning the robot arm with the suction pad or vacuum device at the second labeling position and releasing the second label from the suction pad or vacuum device;
retreating the suction pad or vacuum device from the second labeling position; and
reading the second label with the second sensors on the movable end of the robot arm.

16. The method of claim 15 further comprising using a proximity sensor on the movable end of the robot arm to adjust the first labeling position to ensure the first labeling position is not at an item edge.

17. The method of claim 15 wherein the second label position is on a different surface of the item than the first label position.

18. The method of claim 15 further comprising detecting arrival of the item in the labeling station with a sensor also configured to measure height of the item.

19. The method of claim 15 further comprising detecting arrival of the item in the labeling station with a sensor that does not perform measuring height of the item.

20. A label printing station comprising:
a printer adapted to attach labels to an item;
a robot arm having a plurality of rotators comprising a torque sensor, and terminating in a vacuum device or suction pad and sensors at a movable end,
at least one sensor configured to measure a height of the item; and
a processor coupled to the printer to, to the sensor to receive the height of the item, to the robot arm to control the robot arm, and to from a server;
wherein the processor has a memory containing code; and
wherein the code configured to position the robot arm with the suction pad or vacuum device at a first labeling position further comprises code configured to verify that the first labeling position is not at an item edge.

* * * * *